United States Patent [19]

Röhm

[11] 4,418,926
[45] * Dec. 6, 1983

[54] NONLOOSENING DRILL CHUCK

[76] Inventor: Günter H. Röhm, Heinrich-Röhm-Strasse 50, 7927 Sontheim, Fed. Rep. of Germany

[ * ] Notice: The portion of the term of this patent subsequent to Jun. 22, 1997 has been disclaimed.

[21] Appl. No.: 278,066

[22] Filed: Jun. 29, 1981

[30] Foreign Application Priority Data

Jul. 2, 1980 [DE] Fed. Rep. of Germany ....... 3025021

[51] Int. Cl.³ ........................ B23B 31/04; B23B 31/12
[52] U.S. Cl. ...................................... 279/62; 279/1 K; 81/90 A
[58] Field of Search ...................... 279/1 K, 60, 61, 62, 279/63, 64, 65, 56, 59, 52, 48, 116, 115; 81/90 A, 114, 115, 128

[56] References Cited

U.S. PATENT DOCUMENTS 4,213,622 7/1980 Rohm ..................................... 279/61

FOREIGN PATENT DOCUMENTS 2035152 6/1980 United Kingdom .................. 279/60

Primary Examiner—Z. R. Bilinsky
Assistant Examiner—Thomas M. Kline
Attorney, Agent, or Firm—Karl F. Ross; Herbert Dubno

[57] ABSTRACT

A drill chuck has a chuck body rotatable about a chuck axis and formed with a radially open threaded bore and with a radially open unthreaded bore. A plurality of jaws are radially displaceable on the chuck body. A tightening ring is rotatable on the body about the axis thereof and is connected via screwthread formations with the jaws to displace same radially inwardly when the ring is rotated in a tightening direction and to displace them radially outwardly when rotated in an opposite loosening direction. A screw threaded in the threaded bore is screwable therein in one direction for radial inward displacement and in the opposite direction for radial outward displacement into engagement with the ring. Thus the screw can be screwed out to engage the ring and block its rotation. This screw is formed with a radially outwardly open recess into which the end of the handle of a chuck key can fit. Otherwise this key can fit in the normal manner into the unthreaded bore of the chuck body to engage teeth formed on the tightening ring to open and close the chuck.

5 Claims, 2 Drawing Figures

NONLOOSENING DRILL CHUCK

FIELD OF THE INVENTION

The present invention relates to drill chuck. More particularly this invention concerns a drill chuck provided with a locking mechanism for preventing it from becoming loosened during use from a tool fitted to it.

BACKGROUND OF THE INVENTION

A drill chuck normally has a chuck body rotatable about a chuck axis and provided at its front side with a plurality of axially forwardly projecting and radially displaceable jaws. A tightening ring rotatable on the body about the axis thereof is connected via appropriate screwthread formations to the jaws so that when this ring is rotated on the chuck body about the axis in a tightening direction the jaws are displaced radially toward each other and when rotated in an opposite loosening direction the jaws are displaced apart.

Normally the axially forward edge of the tightening sleeve or ring is formed with an array of teeth and the chuck body is formed with a radially outwardly open bore spaced slightly ahead of this array of teeth. The tip of a chuck key can be inserted in this bore so that teeth on the chuck head mesh with the teeth of the tightening ring. The chuck key can then be rotated to bring considerable torque to bear on the tightening ring and make the chuck very tight. Normally the tightening ring is a heavy cast element formed with the gear teeth for cooperation with the chuck key and with the screwthread for moving the jaws. The tightening sleeve that is fixed to this is a much lighter sheet-metal element and serves mainly to allow fast opening and closing of the chuck by hand.

When such a drill chuck is subjected to considerable vibration, as in a hammer drill, it can frequently loosen. Complex ratchet devices have been proposed to counter this tendency. The extra cost of these arrangements is normally excessive, and they also normally allow a small amount of loosening until the mechanism locks in a ratchet position.

OBJECTS OF THE INVENTION

It is therefore an object of the present invention to provide an improved drill chuck.

Another object is to provide a lockable or nonloosening chuck which can be locked in any position and which can be manufactured at low cost.

SUMMARY OF THE INVENTION

These objects are attained according to the instant invention in a chuck of the above-described general type, but wherein the chuck body is also formed with a radially outwardly open threaded bore that is at least partially axially overlapped by the tightening ring. A locking screw is threaded into this bore and is screwable therein in one direction for radial inward displacement and in the opposite direction for radial outward displacement into engagement with the ring. Thus this screw can be screwed out into tight engagement with the inner surface of the ring to lock this ring in any angular position relative to the chuck body.

Thus with the system according to the instant invention a single moving part—the locking screw—can solidly arrest the tightening ring and sleeve in any position on the chuck body. Since the force the locking screw exerts on the tightening element is radial of the drill rotation axis, and the screw must be rotated about a radial axis to loosen, normal vibration cannot normally be effective to screw in the locking screw and loosen the chuck.

According to another feature of this invention the screw and bore are centered on a radial axis. The screw is formed with a polygonal-section recess extending along this radial axis and radially of the chuck axis. This recess is axially offset from the ring and allows a tool to be inserted into the screw to rotate it and lock or unlock the chuck. This tool according to the instant invention may simply be formed by a polygonal-section end of the chuck-key handle. Thus once the chuck is tightened with this chuck key, it is turned around and is used to screw out the locking screw to lock the chuck.

In accordance with another feature of this invention the locking screw and its bore have complementary left-hand threads. The tigtening ring only partially axially overlaps the tightening screw, leaving enough of it exposed that the tool can be fitted into its recess to rotate it. The tightening sleeve of the chuck is normally rotated clockwise or to the right as seen from behind to tighten the chuck, so that the locking screw and tightening ring will be braced against each other. When the locking screw is screwed to the right to unlock the chuck, this will exert a component of force on the tightening ring in the loosening direction; this force is frequently large enough to break the tightening ring loose so that further loosening can be done by hand.

The system according to the instant invention can be produced at very low cost. The tightening sleeve, which is used only for manual operation of the chuck, can be made inexpensively of sheet metal, and the rest of the chuck can similarly be of standard construction, while still being lockable in any position.

DESCRIPTION OF THE DRAWING

The above and other objects, features, and advantages will become more readily apparent from the following, reference being made to the accompanying drawing in which.

SPECIFIC DESCRIPTION

Figure 1:
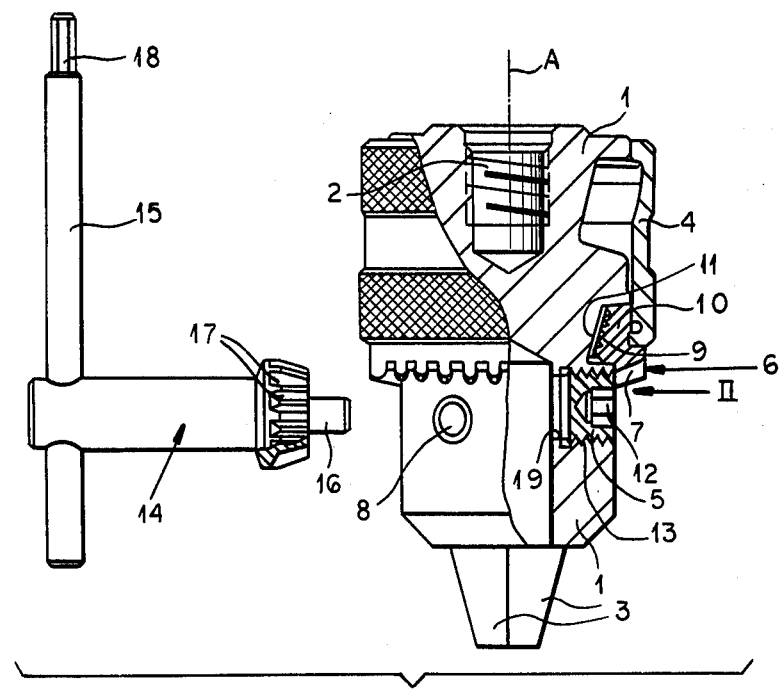
FIG. 1 is a side view partly in axial section through the chuck and key according to this invention.
Figure 2:
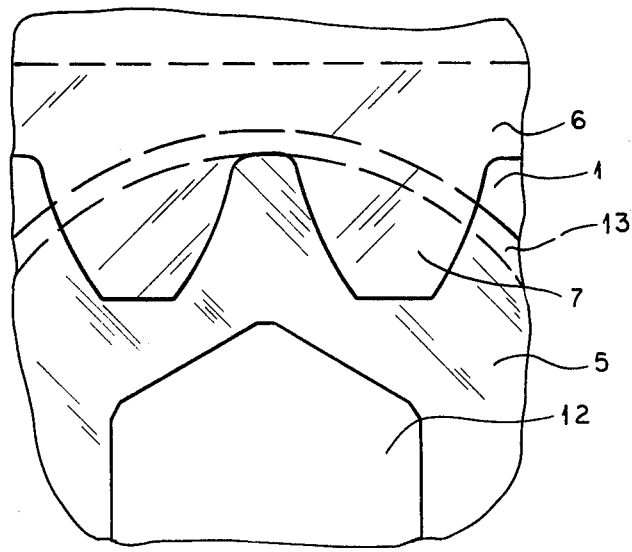
FIG. 2 is a large-scale view taken in the direction of arrow II of FIG. 1.

As seen in FIG. 1 a chuck according to the instant invention has a chuck body 1 centered on an axis A and formed at its rear side with an axially backwardly open threaded bore 2 adapted to be screwed over the drive spindle of a drill. Projecting from its front side are three identical jaws 3 that ride as is well known in the art on respective guides that are inclined relative to the axis A so that when the jaws 3 move axially fowardly they move radially inwardly and vice versa.

A tightening sleeve 4 centered on the axis A carries at its front end a tightening ring 10 received in a radially outwardly open groove 11 formed in the body 1. This ring 10 has an inner surface forming a continuation of the above-described unillustrated jaw guides and formed with a screwthread 9 that meshes with corresponding screwthreads formed on the outer surfaces of the jaws 3. Thus as the sleeve 4 and ring 10 are rotated clockwise, as seen from above in the drawing, the jaws 3 are moved axially forwardly and radially inwardly, and when rotated counterclockwise they are moved axially backwardly and radially outwardly, as is standard in the art.

The front edge of the ring 4 is formed with an array 6 of teeth 7 and the chuck body is formed with at least one radially outwardly open cylindrical bore 8 spaced axially somewhat forward of the teeth 7. A chuck key 14 has a cylindrical tip 16 that can fit in the bore 8 and a toothed head 17 that can mesh with the teeth 7 when this tip 16 is inserted in the bore 8. The chuck key 14 further has a transverse handle 15 that can be gripped by the user for tightening or loosening the chuck in the manner also well known in the art.

According to the instant invention the chuck body 1 is formed with a radially outwardly open bore 19 having a left-hand screwthread 13 and receiving a locking screw 5. This bore 19 is axially mostly forward of the ring 10 whose teeth 7 axially overhang it forwardly. The screw 5 is formed with a hexagonal-section recess 12 that is complementary to a hexagonal-section end 18 of the chuck-key handle 15.

The handle end 18 can therefore be engaged is the recess 12 which is axially slightly forward of the teeth 7 so that the chuck key 14 can be used to rotate this screw 5 in the bore 19. Once a tool has been tightly clamped by the jaws 3, normally torquing the chuck tight with the key 14, the tip 16 of the key 14 is withdrawn from the bore 8 and the handle end 18 is inserted in the hole 12. The screw 5 is then rotated counterclockwise to screw it out until it engages radially outwardly against the inner surface 9 of the ring 10. This action effectively locks the ring 10 and sleeve 4 against rotation about the axis A relative to the body 1. The left-hand thread 13 ensures that forces transmitted to the screw 5 during drilling do not screw the screw 5 back in and allow the chuck to loosen.

Thus with the system according to the instant invention it is possible to lock up the chuck very tightly so that self-loosening is completely ruled out. The chuck can be locked in any position, as the inner surface 9 is cylindrical and smooth so that the screw 5 can engage it at any location.

I claim:

1. A drill chuck comprising:
   a chuck body rotatable about a chuck axis and formed with a radially outwardly open threaded bore;
   a plurality of jaws radially displaceable on said body;
   a tightening ring rotatable on said body about said axis and at least partially axially overlapping said bore;
   means including interengaging formations on said jaws and on said ring for radially displacing said jaws inwardly toward one another when said ring is rotated on said body in a tightening direction and for radially displacing said jaws outwardly away from each other when said ring is rotated on said body in a loosening direction opposite said tightening direction; and
   a screw threaded in said bore and screwable therein in one direction for radial inward displacement in said bore and in the opposite direction for radial outward displacement into engagement with said ring, whereby when said screw is screwed out it engages said ring and blocks rotation of same.

2. The chuck defined in claim 1 wherein said ring has an inner surface engageable with said screw.

3. The chuck defined in claim 2 wherein said screw and bore are centered on a radial axis, said screw being formed with a polygonal-section recess extending along said radial axis and radially of said chuck axis and axially offset from said ring.

4. The chuck defined in claim 3 wherein said bore and screw are formed with complementary left-hand screwthreads.

5. The chuck defined in claim 3 wherein said chuck body is formed axially offset from said ring with another radially outwardly open bore, said ring having an array centered on said axis of teeth projecting axially toward said jaws, said chuck further comprising a chuck key having:
   a tip fittable in said other bore,
   a gear head meshable with said array of teeth when said tip is fitted in said other bore, and
   a handle having a polygonal-section end complementary to said recess.

* * * * *